United States Patent [19]

Hoyler et al.

[11] 4,250,984
[45] Feb. 17, 1981

[54] ELECTROMOTOR DRIVEN REGULATING ARRANGEMENT, ESPECIALLY FOR REGULATING THE SPEED OF A MOTOR VEHICLE

[75] Inventors: Alfred Hoyler, Bühlertal; Bernd Niklaus, Rastatt, both of Fed. Rep. of Germany

[73] Assignee: Robert Bosch GmbH, Stuttgart, Fed. Rep. of Germany

[21] Appl. No.: 962,896

[22] Filed: Nov. 22, 1978

[30] Foreign Application Priority Data

Dec. 31, 1977 [DE] Fed. Rep. of Germany ....... 2759188

[51] Int. Cl.$^3$ ...................... F16D 13/02; F16D 13/08
[52] U.S. Cl. ................... 192/12 D; 64/30 E; 192/26; 192/81 C; 192/84 T
[58] Field of Search ............. 192/12 R, 12 D, 12 BA, 192/26, 56 C, 81 C, 84 T; 64/30 E

[56] References Cited

U.S. PATENT DOCUMENTS

| 2,577,181 | 12/1951 | Christensen | 192/17 D |
| 2,782,644 | 2/1957 | Wiseman | 192/81 C |

FOREIGN PATENT DOCUMENTS 539158  4/1957  Canada ................................ 192/81 C

*Primary Examiner*—Allan D. Herrmann
*Attorney, Agent, or Firm*—Michael J. Striker

[57] ABSTRACT

An electromotor driven regulating arrangement, especially for regulating the speed of a motor vehicle, comprises an input shaft rotatable in one and in the opposite direction by a reversible electric motor, an output shaft adapted to be connected to a member for regulating the speed of the vehicle, and a coupling having two coupling members respectively connected with the input shaft and the output shaft for rotation therewith and a looped spring arranged between the coupling members by means of which the coupling members may be connected for simultaneous rotation in either direction. The arrangement comprises further a control member and electromagnet means cooperating therewith and acting on the spring for rendering the coupling active or inactive depending on whether the electromagnet is energized or deenergized.

14 Claims, 2 Drawing Figures

ELECTROMOTOR DRIVEN REGULATING ARRANGEMENT, ESPECIALLY FOR REGULATING THE SPEED OF A MOTOR VEHICLE

BACKGROUND OF THE INVENTION

The present invention relates to an electromotor driven regulating arrangement, especially for regulating the speed of a motor vehicle and comprising a drive or input shaft driven by an electromotor, an output shaft for transmission of the adjusting force of the arrangement to a speed regulating member, a coupling having two coupling members respectively connected to the drive shaft and the output shaft, and an electromagnet for actuating the coupling.

Regulating arrangements driven by an electromotor have with respect to regulating arrangements actuated by an electromagnet the advantage of a greater adjusting path at a large adjusting force.

A regulating arrangement driven by an electromotor of the above-mentioned kind has already been suggested in which the coupling is disengaged by means of a strong spring and may be engaged by energizing an electromagnet. By energizing the electromagnet the two coupling elements of the coupling are pressed, against the force of the spring, against each other for simultaneous rotation by the force of the magnet. If the magnet is deenergized the two coupling parts move instantaneously back to their starting position so that the coupling is again disengaged.

Such magnetically operated couplings require a relatively large magnetic force for engaging the coupling and for holding the coupling parts in engaged position. This in turn requires a large current for energizing the magnet and therewith electronic elements of large capacity for controlling the magnet. Such arrangements require, therefore, not only a relatively large current, but are also, due to the required control electronic for controlling the electromagnet, relatively expensive. In addition, the large volume and weight of the necessary electromagnet act disadvantageously on the control element of the regulating arrangement. Therefore, these known arrangements are not suitable for certain applications.

SUMMARY OF THE INVENTION

It is an object of the present invention to provide a regulating arrangement driven by an electromotor which avoids the disadvantages of such arrangements known in the art.

More specifically, it is an object of the present invention to provide a regulating arrangement driven by an electromotor which has a small volume, requires a very small energizing current for the coupling magnet and can be produced at very reasonable cost.

With these and other objects in view, which will become apparent as the description proceeds, the electromotor driven regulating arrangement according to the present invention mainly comprises a housing, an input shaft rotatably mounted in the housing, a reversible electromotor for rotating the input shaft, an output shaft rotatably mounted in the housing, coupling means for coupling and decoupling said input shaft to said output shaft and comprising two coupling members respectively connected to the input shaft and the output shaft for rotation therewith and looped spring means between the two coupling members for connecting the coupling members for simultaneous rotation in either direction of rotation of the input shaft, and control means comprising a control member cooperating with the looped spring means and electromagnet means for cooperating with the control member for rendering said coupling means active or inactive depending on whether said electromagnet is energized or deenergized.

In the control arrangement according to the present invention the actual coupling force is transmitted by the looped spring means which are tightened during turning of the coupling members. The control means acts only, on the one hand, that the looped spring means are tightened to thereby connect the two coupling members for simultaneous rotation and, on the other hand, that such a tightening of the looped spring means during rotation of the coupling members is prevented. The electromagnet for actuating the control means needs, therefore, to apply only a very small magnetic force. The magnet may, therefore, be constructed very small. Likewise the energizing current for the magnet can be held very small. This small energizing current makes it possible to use inexpensive electronic elements for controlling the electromagnet. The looped spring means will assure a slipless transmission of the turning moment from one to the other of the coupling members since with increasing moment the looped spring is further tightened and the transmission force between the two coupling members increased. The transmission of very large turning moments is, therefore, possible. The coupling with the looped spring means is sturdy, requires substantially no maintenance and is distinguished by a long operating life. The coupling as well as the drive motor may be constructed in a compact manner and from relatively simple parts. Thus, for instance, the two coupling members and the looped spring means may be arranged coaxially on a common shaft, which forms the output shaft of the control arrangement. The interfitting coupling members result, in combination with the electromagnet of small volume for controlling the control element, in a regulating arrangement of very small dimensions. By use of a geared fractional horse-power electromotor, it is possible to provide a combined housing for the motor, the coupling and the electromagnet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
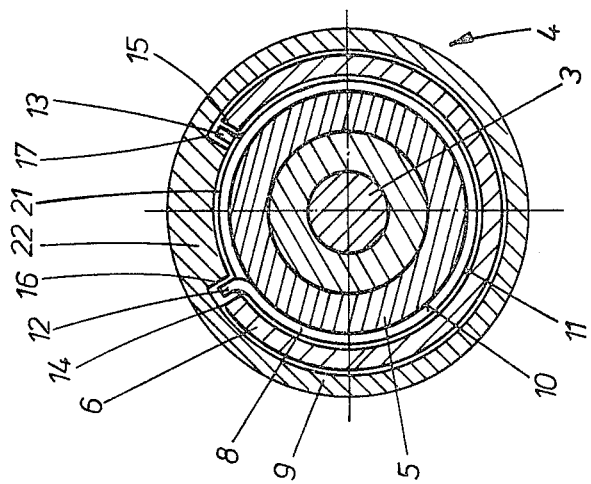
FIG. 2 is a cross-section taken along the line II—II of FIG. 1.

The regulating arrangement shown in the drawing is especially intended for a device for automatic regulation of the speed of a motor vehicle. Such devices, known under the name "Tempostat" maintain the driving speed of a motor vehicle at a constant value. For this purpose the accelerating lever of the motor vehicle, that is the gas pedal, is brought to a predetermined position and adjusted by the control arrangement in dependence on a signal.

Figure 1:
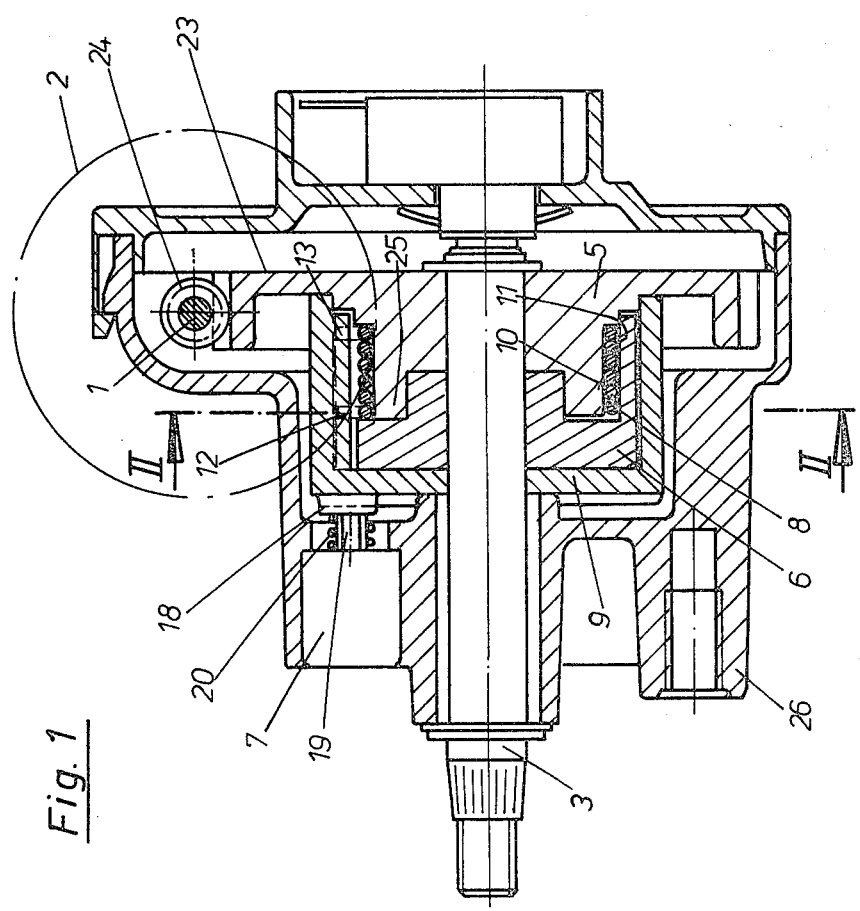
FIG. 1 is an axial cross-section through the regulating arrangement according to the present invention.

As shown in FIG. 1, the electromotor driven regulating arrangement comprises a drive or input shaft 1 which is driven from an electromotor 2, indicated by dash-dot lines in FIG. 1. An output shaft 3 is provided for transmission of the adjusting force, for instance onto the gas pedal of a motor vehicle. The two shafts 1 and 3 are mounted for rotation, for instance about axes extending normal to each other, in a housing 26 which may be combined with the housing of the electromotor 2 into a single unit. A coupling 4 is arranged between the drive shaft 1 and the output shaft 3. The coupling has two coupling members 5 and 6 respectively connected to the drive shaft 1 and the output shaft 3 for simultaneous rotation with the same. The coupling 4 is actuated by an electromagnet 7 mounted in the aforementioned housing.

A looped spring or coil spring 8 is arranged between the two coupling members 5 and 6 by means of which the coupling members, during rotation in either direction, may be connected for simultaneous rotation. A control element 9, actuatable by the electromagnet 7, cooperates with the looped spring 8 in such a manner that, as will be explained later on in further detail, the force transmission between the coupling members 5 and 6 may be enacted or terminated. For the purpose of regulating the speed of a motor vehicle, it is essential that the coupling 4 is normally disengaged and periodically engageable. The control element 9 is, therefore, constructed and cooperates with the electromagnet 7 in such a manner that the force transmission between the two coupling members 5 and 6 is interrupted when the electromagnet 7 is deenergized and established upon energizing of the electromagnet.

The coupling member 5 has an outer cylindrical surface 10 and the coupling member 6 has an inner cylindrical surface 11 radially outwardly spaced from the outer cylindrical surface 10 and coaxial with respect thereto and the looped spring 8 is arranged between the two cylindrical surfaces 10 and 11 coaxially therewith. The looped spring 8 abuts against one of the cylindrical surfaces 10 or 11 and the angularly bent ends 12 and 13 thereof are coordinated with abutment faces 14 and 15 which are arranged spaced from each other on the other cylinder surface in such a manner that by relative rotation of the two cylinder surfaces 10 and 11 with respect to each other a respective one of the spring ends 12, respectively 13, engages a respective one of the abutment faces 14, respectively 15. The control member 9 has two control faces 16 and 17 spaced in circumferential direction from each other which, when the electromagnet 7 is deenergized are stationarily arranged in the path of the abutment faces 14 and 15 and the spring ends 12 and 13 are arranged with play respectively between the control surface 16, respectively 17, and a corresponding abutment face 14, respectively 15. The control element 9 is thereby arranged coaxial with and turnable with respect to the cylindrical surfaces 10 and 11. Its control faces 16 and 17 are permanently located in the path of the abutment faces 14 and 15 and the spring ends 12 and 13. When the electromagnet 7 is deenergized, then the control member 9 is to held against rotation, whereas when the electromagnet is energized the control member 9 is freely turnable about its axis. For this purpose the control member 9 is provided on its end wall with a gearing 18 into which a detent 19 connected to the armature of the electromagnet 7 engages under the action of a spring 20. The magnetic force of the electromagnet is chosen greater than the force of the spring 20, so that the spring force may be overcome by energizing the magnet.

In the embodiment of the coupling 4 illustrated in FIGS. 1 and 2, the looped spring 8 abuts against the radially inner cylinder surface 10. The radially outer cylinder surface 11 is provided with a cutout 21 into which the spring ends 12 and 13 of the looped spring 8 project. The inner diameter of the looped spring 8, in unstressed condition, is slightly smaller than the diameter of the radially inner cylinder surface 10. Thereby, the looped spring 8 engages with a small frictional force the radially inner cylinder surface 10 and may be taken along during rotation of the coupling member 5. The looped spring 8 is constructed as a coil spring so that the two ends 12 and 13 thereof are displaced in axial direction. The looped spring 8 is formed from spring steel of circular or rectangular cross-section. The cutout 21 in the radially outer cylinder surface 11 extends in axial direction at least over the length of the coil spring 8 so that the two spring ends 12 and 13 may extend into the cutout 21. The two control faces 16 and 17 of the freely turnable control member 9 delimit a control cam 22 which projects into the cutout 21. The control cam 22 has likewise an axial length corresponding to the axial length of the looped spring 8. The two coupling members 5 and 6 are arranged on a common shaft, which is the output shaft 3 of the control arrangement. It is to be understood that the function of the drive shaft 1 and the output shaft 3 may be exchanged so that, for instance, the electromotor 2 may be connected to the shaft 3, in which case the shaft 1 will be the output shaft for transmission of the adjusting force. In the illustrated embodiment, the coupling member 6 provided with the radially outer coupling surface 11 is fixedly connected with the output shaft 3 and of bell-shaped construction. The inner axially extending surface of the bell-shaped coupling member 6 forms thereby the radially outer cylinder surface 11 of the coupling. The coupling member 5 is arranged freely rotatable on the output shaft 3 and is constructed as worm gear 23 which meshes with a worm 24 fixed to the drive shaft 1 for rotation therewith. The worm gear 23 has a hub 25 which coaxially projects into the bell-shaped outer coupling member 6, whereby the outer cylindrical surface of the hub 25 forms the radially inner cylindrical surface 10 of the coupling 4.

The control member 9 is freely turnably arranged on the output shaft 3 and constructed as a bell surrounding the hub 25 of the coupling member 5 and the coupling member 6. The control cam 22 projects radially inwardly from the inner cylindrical surface of the bell-shaped control member 9. The electromagnet 7 is arranged in the housing 26 surrounding the coupling members 5 and 6 and the control member 9 and oriented in such a manner that the pulling direction of the electromagnet extends parallel to the axis of the output shaft 3. As mentioned before, the two shafts 1 and 3 are mounted for rotation in the housing 26.

The above-described regulating arrangement will operate as follows:

If the electromagnet is energized, it attracts its armature so that the detent 19 is moved out of the gearing 18 provided on the end face of the bell-shaped control member 9. The control member 9 is thereby freely turnable on the output shaft 3. If now the electromotor 2 is switched on, then the worm 24 fixed to the drive shaft 1 of the electromotor 2 is turned. This turning movement of the drive shaft 1 is transmitted to the coupling member 5 forming the worm gear 23, so that the coupling member 5 starts to turn on the output shaft 3 corresponding to the rotation of the electromotor in clockwise or counterclockwise direction. In the following, it is assumed that the coupling member 5 rotates in counterclockwise direction. Due to the small frictional force between the looped spring 8 and the hub 25 forming the radially inner cylindrical surface 10, the looped spring 8 is taken along in counterclockwise direction during turning of the coupling member 5 in this direction, until the spring end 12 engages the abutment face 14 in the cutout 21 of the coupling member 6. During further rotation of the coupling member 5, the looped spring 8 is, therefore, tightened and the coupling member 6, fixedly connected to the output shaft 3, is taken along by means of the spring end 12 and the abutment face 14 so that the output shaft 3 is turned. The control member 9, released for rotation due to the energizing of the electromagnet 7, turns synchronously with the two coupling members 5 and 6.

When the electromagnet is deenergized, the detent 19 engages under the influence of the force of the spring 20 with the gearing 18, arresting thereby the control member 9. Since the two coupling members 5 and 6 first continue to rotate, the spring end 13 will engage the abutment face 17 of the control cam 22. Thereby the looped spring 8 expands radially and the force transmission between the radially inner surface 10 and the looped spring 8 will be terminated. The couplng member 5 can thereby freely rotate on the shaft 3 while the coupling member 6 is held stationarily and the coupling 4 is thereby disengaged.

If the electromotor 2 is rotated in the reverse direction, that is in clockwise direction, the coupling 4 will be actuated by engagement of the spring end 13 with the abutment face 15 of the cutout 21 in the outer coupling member 6. The coupling 4 will be disengaged during deenergizing of the magnet 7 and the therewith arrested control member 9 by pressing of the control face 16 of the control cam 20 onto the end 12 of the looped spring 8. The engagement and disengagement of the coupling occurs very fast since the control faces 16 and 17 of the control cam 22 and the abutment faces 14 and 15 of the cutout 21 in the coupling member 6 permit only very little play for the turning movement of the two spring ends 12 and 13 of the looped spring 8. The coupling operates slipless and is adapted to transmit very large turning moments since the force transmission between the looped spring 8 and the cylindrical surface 10 of the coupling member 5 increases with increase of the turning moment. As already mentioned before, it is possible to exchange the function of the output shaft 3 and the drive shaft 1 without changing of the control arrangement, whereby the electromotor 2 has to be coupled with the shaft 3 and the adjusting force has to be taken up from the shaft 1.

It will be understood that each of the elements described above, or two or more together, may also find a useful application in other types of regulating arrangements driven by an electromotor, differing from the types described above.

While the invention has been illustrated and described as embodied in a regulating arrangement driven by an electromotor including coupling means for coupling and decoupling an input shaft to and from an output shaft of the arrangement in which the coupling means comprise looped spring means between two coupling members respectively connected to the two shafts for rotation therewith, it is not intended to be limited to the details shown, since various modifications and structural changes may be made, without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention.

What is claimed as new and desired to be protected by Letters Patent is set forth in the appended claims:

1. An electromotor driven regulating arrangement, especially for regulating the speed of a motor vehicle, comprising a housing; an input shaft rotatably mounted in said housing; a reversible electromotor connected to said input shaft for rotating the same; an output shaft rotatably mounted in said housing; coupling means for coupling and decoupling the shafts, said coupling means comprising two coupling members respectively connected to said input shaft and said output shaft for rotation therewith, each of said coupling members having a cylindrical surface being arranged radially spaced from and concentric with each other, and looped spring means for connecting said coupling members for simultaneous rotation in either direction of rotation of said input shaft being arranged between said cylindrical surfaces, slidingly engaging one of said cylindrical surfaces and having a pair of angularly bent ends, the other of said cylindrical surfaces being provided with two abutment faces arranged in such a manner that during rotation of the two coupling members relative to each other one of said spring ends will engage one of said abutment faces; and control means comprising a control member cooperating with said looped spring means and electromagnet means cooperating with said control member for rendering said coupling means active or inactive depending on whether the electromagnet means is energized or deenergized, and wherein said control member has a pair of control faces which, when said electromagnet means is deenergized, are arranged stationarily in the path of movement of said abutment faces and said spring ends in such a manner that one of said spring ends is arranged with play between one of said control faces and one of said abutment faces, and wherein said looped spring means engages the radially inner of said cylindrical surfaces and wherein the radially outer of said cylindrical surfaces is provided with a cutout through which said bent spring ends project, said control member having a projection bounded in circumferential direction by said control faces and extending into said cutout in said radially outer cylindrical surface.

2. A regulating arrangement as defined in claim 1, wherein said electromagnet means cooperates with said control member so that said coupling means is rendered inactive when said electromagnet means is deenergized and rendered active when said electromagnet means is energized.

3. A regulating arrangement as defined in claim 1, wherein said control arrangement is provided with a gearing and wherein said electromagnet means comprises an armature and a detent connected with the armature and including spring means for biasing said detent in engagement with said gearing, the magnetic force of said electromagnet means being greater than the biasing force of said spring means so that the detent is drawn out of engagement with said gearing when said electromagnet is energized.

4. A regulating arrangement as defined in claim 1, wherein said looped spring means is wound with an inner diameter which is slightly smaller than the diameter of the radially inner cylindrical surface so that the looped spring means frictionally engages said radially inner cylindrical surface.

5. A regulating arrangement as defined in claim 4, wherein said looped spring means is a coil spring and wherein said cutout in said outer cylindrical surface has an axial length which is at least equal to the length of said coil spring.

6. A regulating arrangement as defined in claim 1, wherein said looped spring means is a coil spring and wherein said cutout has an axial length at least equal to that of the axial length of said coil spring.

7. A regulating arrangement as defined in claim 1, wherein said coupling members are coaxially arranged on one of said shafts and wherein one of said coupling members is fixed to said one shaft for rotation therewith and the other of said coupling members is freely rotatable on said one shaft.

8. A regulating arrangement as defined in claim 7, wherein said one shaft is said output shaft.

9. A regulating arrangement as defined in claim 7, wherein each of said coupling members has a cylindrical surface, the cylindrical surfaces being arranged radially spaced from and concentric with each other and said looped spring means being arranged between said surfaces and frictionally engaging the radially inner of said surfaces, the coupling member provided with the radially outer of said cylindrical surface being fixedly connected to said one shaft and bell-shaped and having a peripheral wall having an inner surface forming the radially outer cylindrical surface of said coupling means.

10. A regulating arrangement as defined in claim 9, wherein the coupling member provided with the radially inner cylindrical surface is constructed as a worm gear, and including a worm fixed to the other of said shafts and meshing with said worm gear.

11. A regulating arrangement as defined in claim 10, wherein said worm gear has a cylindrical hub projecting into the peripheral wall of said bell-shaped coupling member and wherein the peripheral surface of said hub forms the radially inner cylindrical surface of said coupling means.

12. A regulating arrangement as defined in claim 10, wherein said other shaft is said input shaft.

13. A regulating arrangement as defined in claim 1, wherein said coupling members are coaxially arranged on one of said shafts and wherein one of said coupling members is fixed to said one shaft for rotation therewith and the other of said coupling members is freely rotatable on said one shaft, said control member being bell-shaped and arranged freely rotatable on said one shaft and having a peripheral wall surrounding said coupling members, said projection being carried by said peripheral wall of said bell-shaped control members.

14. A regulating arrangement as defined in claim 13, wherein said control member is provided with a gearing and wherein said electromagnet means comprises an armature and a detent connected with said armature, and including spring means for biasing said detent into said gearing, said electromagnet means being constructed so that said detent is drawn out of said gearing when said electromagnet means is energized, said housing surrounding said coupling members, said control member and said electromagnet means being arranged in said housing so that said pulling force exerted thereby onto said detent extends parallel to the axis of said one shaft.

* * * * *